(12) United States Patent
Hammock et al.

(10) Patent No.: US 7,241,008 B2
(45) Date of Patent: Jul. 10, 2007

(54) EYEGLASS FRAME

(76) Inventors: Luther James Hammock, 6113 W. Girard Ave., Philadelphia, PA (US) 19151; Ronald Roy Hammock, 6113 W. Girard Ave., Philadelphia, PA (US) 19151

(*) Notice: Subject to any disclaimer, the term of this patent is extended or adjusted under 35 U.S.C. 154(b) by 0 days.

(21) Appl. No.: 11/149,137

(22) Filed: Jun. 10, 2005

(65) Prior Publication Data

US 2005/0280772 A1    Dec. 22, 2005

Related U.S. Application Data

(60) Provisional application No. 60/581,030, filed on Jun. 21, 2004.

(51) Int. Cl.
*G02C 5/20* (2006.01)

(52) U.S. Cl. ........................ 351/118; 351/119

(58) Field of Classification Search ................ 351/118, 351/119, 111, 115, 116, 41, 158
See application file for complete search history.

(56) References Cited

U.S. PATENT DOCUMENTS

| | | | | |
|---|---|---|---|---|
| 1,751,804 A | * | 3/1930 | Fischer | 351/118 |
| 1,841,052 A | * | 1/1932 | Pollmiller | 351/118 |
| 4,799,782 A | * | 1/1989 | Tuttle | 351/118 |

* cited by examiner

*Primary Examiner*—Hung Xuan Dang

(57) ABSTRACT

An adjustable eyeglass frame temple is disclosed that provides fast and easy adjustment. The primary adjustment is a is a two piece telescoping temple that is adjusted by a screw within the temple thru a twist-lock (32) mechanism. The screw is accessible from the rear portion of the temple allowing the temple to be adjusted while the eyeglasses are being worn. It is also possible for eyeglass wearers to make the adjustments by themselves, while wearing the glasses.

1 Claim, 1 Drawing Sheet

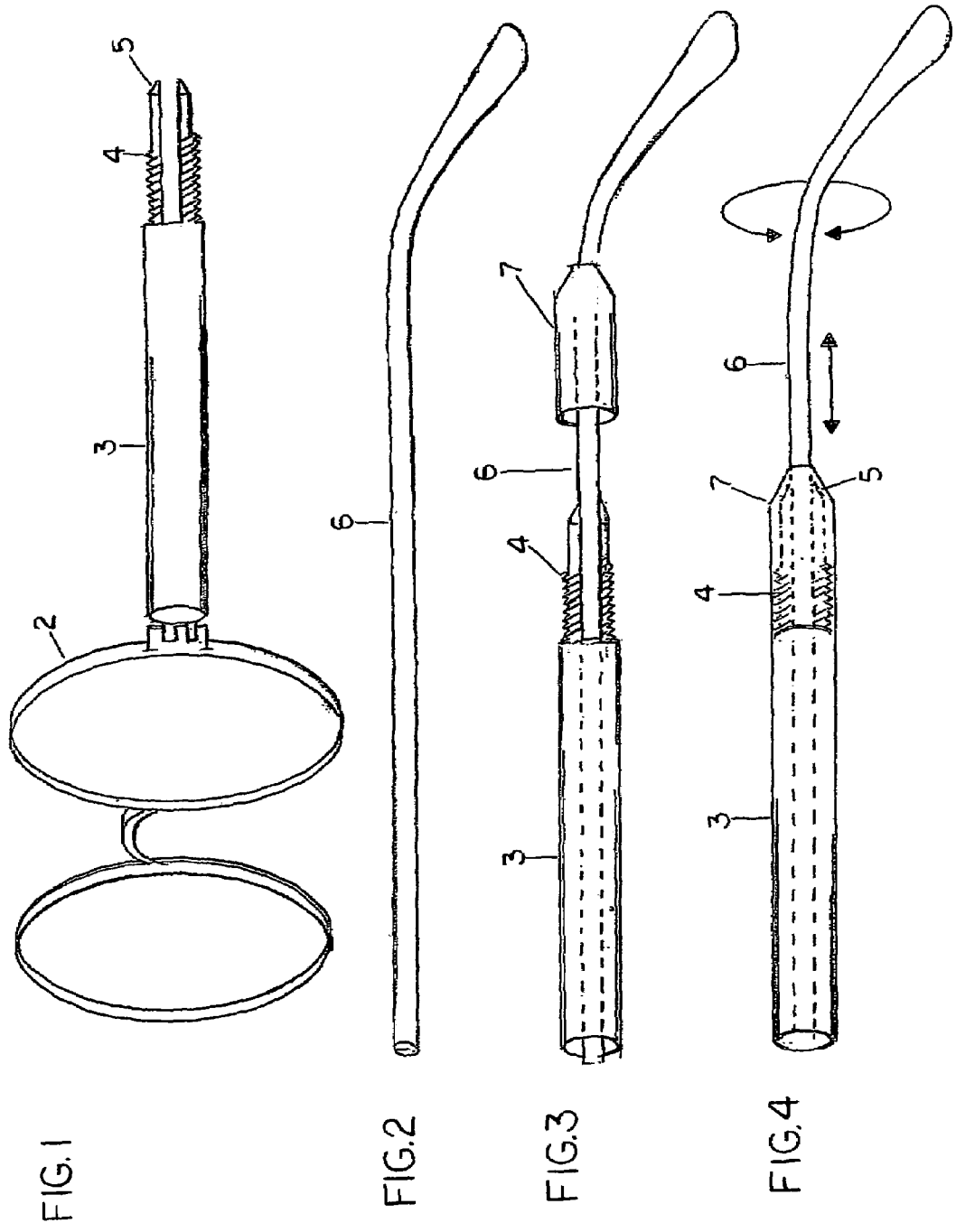

EYEGLASS FRAME

CROSS REFERENCE TO RELATED APPLICATIONS

This application claims the benefits of provisional patent application Ser. No. 60/581,030 filed Jun. 21, 2004 by present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to adjustable eyeglass frames, and more particularly to adjustable eyeglass frames having telescoping ear pieces that are further adapted to rotationally swivel and lock in place for additional comforted.

2. Prior Art

Today, millions of people wear eyeglass frames, and more particularly to filter sunlight, and for safety when working in factories, for example. The two most important aspects of making a usable pair of glasses are the proper grind of the lenses, and the proper sizing of the frame. Although adults usually have minor difficulty in finding proper frames, this is not always the case, especially when the glasses are used on a worksite for safety reasons. These glasses can be used with many different employees and will tend to be difficult to fit the vast majority of employees.

A much larger problem arises when glasses are needed for children. Since children grow quickly, it is possible that a child may outgrow a frame in less than one year. Constantly upsizing eyeglass frames can become expensive. Moreover, in addition to adjusting the length of the temples a need exist for a means to rotationally adjust or swivel the temple member for better fit and comfort.

In the past, several attempts to provide means of adjusting frames have been patented. U.S. Pat. No. 1,252,126, to Letzeisen discloses a frame having a wire temple. The temple was slidably attached to the frame with a locking adjusting screw. This adjusting screw can be loosen to allow the temple to slide back and forth until the desired length of temple is found. The nut can then be locked in place, restraining the temple.

U.S. Pat. No. 1,841,052 to Pollmiller, U.S. Pat. No. 1,751,804 to Fischer, U.S. Pat. No. 2,503,275 to Klienman, and U.S. Pat. No. 2,856,813 to Kudelko all disclose eyeglass adjusters utilizing some type of adjusting screw mechanism to adjust the temples. In these patents, the temples are fitted with an adjusting screw portion fitted into a threaded portion. As the adjusting screw is turned, the earpiece is either extended or retracted from the temple.

Typically, these devices include some type of locking mechanism to provide the temple from moving thereby changing the distance setting. U.S. Pat. Nos. 3,584,938 and 4,153,346 disclose an alternate means of adjusting the temples. These devices utilize sliding bars having discrete position settings to make the adjustments. In these devices, the temple is held with a pin that secures the bar. The pin is then removed, the bar either extended or retracted until a new set position is aligned with the pinhole, and the pin is replaced.

One of the drawbacks to all these devices is that they all must be adjusted when they are off the wearer's head. This requires the wearer or the fitter to place the frame on the wearer's head, check the fit, remove the frame, make an adjustment, check the fit, remove the frame, make adjustments and so on.

Another drawback of the fixed slide-pin devices is that the pins provide fixed sizes, which limit their use in many cases and will not provide exact fits in many cases. Tuttle in U.S. Pat. No. 4,799,782 developed a lengthwise adjustable temple wherein a lengthwise screw could be turned from the front of the glasses and thereby adjust the length only.

It is an object of this invention to provide adjustable glasses that can be adjusted in the temple both lengthwise and rotationally while the user is wearing them.

It is another object of this invention to provide adjustable glasses that have a twist-lock mechanism on each temple as the adjusting mechanism for temple members that have the portion fitting over the ear angulated or circular.

It is yet another object of this invention to provide an adjustment means for glasses that is totally concealed inside the barrel of a twist-lock.

It is yet a further object of this invention to produce adjustable glasses having a swivel or rotational adjustment means that does not interfere with the operation of the temple hinges.

It is yet a further object of this invention to produce adjustable glasses that have a self locking adjustment mechanism for both length and the angle of the earpiece.

BRIEF SUMMARY OF THE INVENTION

The novel invention utilizes a barrel shaped twist-lock to selectively frictionally fix a position of a cylindrical or rod-like temple in a receiving barrel where the rod-like temple is both lengthwise and rotationally adjustable inside an outside barrel of the twist-lock.

BRIEF DESCRIPTION OF THE DRAWINGS

FIG. 1 is showing the temple tube with a male threaded compressible slot connected to a lens frame.

FIG. 2 is showing the earpiece rod.

FIG. 3 is showing the Twist-Lock barrel with a taper end.

FIG. 4 is showing the Twist-Lock barrel in a close or locked position.

DETAILED DESCRIPTION OF THE INVENTION

Referring now to the drawings as shown in FIG. 1 an temple tube 3 is attached to a lens frame 2 and showing the male threaded portion of the compressible slot 4 and the beveled edged fingers 5 of the compressible slot 4.

FIG. 2 is a side view of the earpiece rod 6

FIG. 3 is a exploded view of temple tube 3 compressible slot 4 and the female threaded barrel of the Twist-Lock with a tapered end 7, FIG. 3 is also showing there is no pressure being applied to compressible slot 4 which allows earpiece 6 to freely pass though temple tube 3 telescopically forward and reverse as well as rotationally.

FIG. 4 is showing Twist-Lock 7 in a closed or locked position. The tapered end of Twist-Lock 7 is applying pressure to the beveled edged fingers 5 of compressible slot 4 thus locking earpiece rod 6 in any telescopically or rotationally desired position as the directional arrows show in FIG. 4 shows.

Due to the way the Twist-Lock Telescopic Eyeglass Frame is made less than a quarter of a turn on the Twist-Lock will lock or release the earpiece rod.

While there have been shown and described the preferred embodiment of an improved eyeglass temple construction made with a twist-lock in accordance with the invention, it will be appreciated that many changes and modifications may be made therein without, however, departing from the essential spirit thereof.

We claim:

1. An adjustable eyeglass frame temple, hingeably attached to an eyeglass frame comprising:
   (A) a temple tube having a front hinge and a rear partially male threaded compressible slot with beveled edged fingers extending outwardly from the said compressible slot
   (B) a twist-lock which is partially female threaded barrel with a tapered barrel end
   (C) a earpiece rod which can rotate on it's axis and telescopically expand and retract as it passes through said temple tube
   (D) said twist-lock when turned can apply or release pressure to said rear partially male threaded compressible slot with said beveled edged fingers which in turn will allow said earpiece rod to be telescopically moved forward or reverse or lock in desired position whereby said twist-lock can adjust in less than a quarter of a turn and will lock or release said earpiece rod.

* * * * *